United States Patent [19]

Hill

[11] 4,222,879
[45] Sep. 16, 1980

[54] SETTLING CLARIFIER

[75] Inventor: Richard N. Hill, Lakeland, Fla.

[73] Assignee: W. R. Grace & Co., New York, N.Y.

[21] Appl. No.: 19,870

[22] Filed: Mar. 12, 1979

[51] Int. Cl.² .......................................... B01D 21/18
[52] U.S. Cl. .................................. 210/520; 210/525; 210/528
[58] Field of Search .................. 210/20, 42 R, 49, 51, 210/52, 53, 54, 83, 84, 70, 173, 207, 208, 219, 199, 220, 221 R, 519, 520, 523, 525, 528, 530, 531

[56] References Cited

U.S. PATENT DOCUMENTS

| Re. 20,761 | 6/1938 | Pruss | 210/55 |
|---|---|---|---|
| 618,814 | 1/1899 | Darby | 210/173 |
| 2,003,357 | 6/1935 | Gilchrist | 210/528 |
| 2,678,730 | 5/1954 | Coulter | 210/49 |
| 2,894,637 | 7/1959 | Schreiber | 210/508 |
| 3,002,400 | 10/1961 | Scott | 210/528 |
| 3,099,622 | 7/1963 | Woerther | 210/49 |
| 3,140,259 | 7/1964 | Kelly | 210/528 |
| 3,245,544 | 4/1966 | Petersen | 210/531 |
| 3,523,889 | 8/1970 | Eis | 210/519 |
| 3,892,666 | 7/1975 | Quast | 210/520 |
| 4,054,514 | 10/1977 | Oltmann | 210/20 |
| 4,120,791 | 10/1978 | Wright | 210/84 |

Primary Examiner—Ernest G. Therkorn
Attorney, Agent, or Firm—Charles L. Harness

[57] ABSTRACT

Settling clarifier for liquids carrying suspended solids, having a two-slope bottom section, with central stilling well for feed, rake system, clear overflow exit means, and sludge underflow means.

2 Claims, 2 Drawing Figures

SETTLING CLARIFIER

The present invention involves clarification apparatus for clarifying liquids containing finely divided suspended solids. The apparatus is particularly useful in clarifying liquids in which the solids comprise fine particles and coarse particles, or a spectrum of solids from fine to coarse, as is found, e.g., in dilute wet process phosphoric acid.

Figure 1:
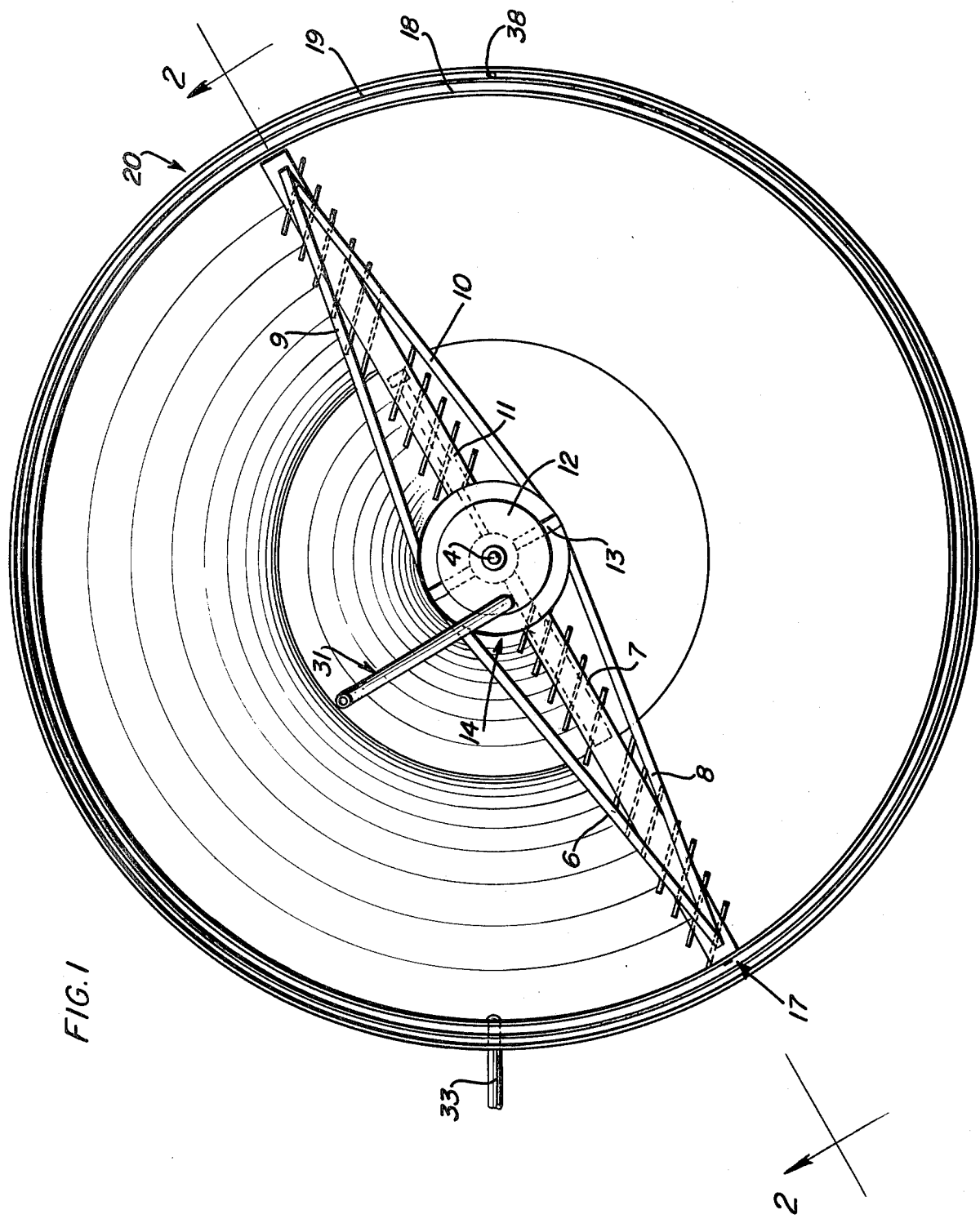
FIG. 1 shows a plan view of the clarifier.
Figure 2:
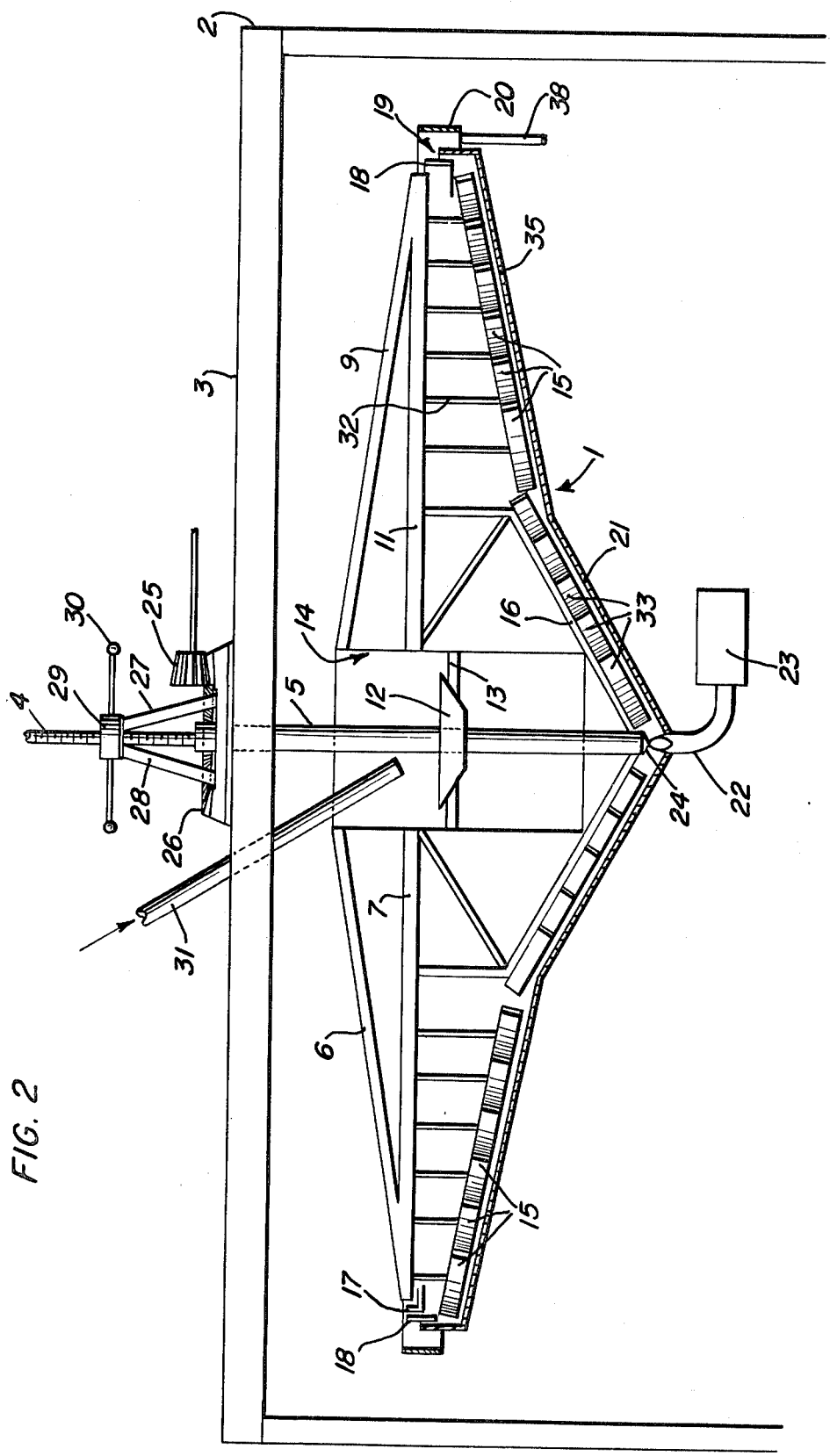
FIG. 2 shows the clarifier in a section taken along line 2—2 of FIG. 1.

Referring to both FIG. 1 and FIG. 2, the clarifier bottom shell shown generally at 1 sits on a suitable conforming scaffolding (not shown) or other equivalent supporting foundation. A superstructure shown generally at 2 provides additional stability and includes a grate-type flooring 3 over the clarifier and a vertical axle 4 which carries vertical sleeve 5, deflector plate 12 and deflector plate support 13 which in turn carries stilling well 14 and upper rake reinforcing arms 6, 8, 9, and 10. The stilling well 14 also supports upper rake arms 7 and 11, which carry a plurality of upper rabble teeth shown generally as 15. These teeth hang from rods shown generally at 32. The upper rake arms 7 and 11 also carry lower rabble teeth support arms 16, which in turn carry a plurality of lower rabble teeth shown generally at 33.

Rake arm 7 carries at its outer tip skimming arm 17. A baffle 18 is positioned inside an overflow weir 19, which delivers to collection launder or annulus. Weir 19 also serves as the outer wall of the vessel, which is thus bound by the bottom shell 1 and the weir wall 19. Clarified product flows from the overflow weir 19 by an exit conduit 38.

Clarifier bottom shell 1 comprises two conical parts, 35 and 21. Cone segment 35 has a relatively gentle slope (typically 0° to 10°) from the horizontal and cone 21 has a somewhat steeper slope, typically 25°-30°, and preferably 30°. Underflow conduit 22 drains product away from the bottom of cone 21, with the aid of a suitable slurry pump 23. Screw 24 breaks up any bottom cake.

An electric motor, not shown, drives a spur 25, which in turn drives a gear 26, which carries support arms 27, 28, connected to bushing 29 for central shaft 4. A lifting wheel, which can be used to lift the rotatable assembly manually, is shown at 30.

A feed conduit is shown at 31 and a skimming removal pipe at 40.

The operation of the clarifier may be exemplified as follows:

EXAMPLE 1

Taking crude phosphoric acid as the feed liquid, the recommended use of this apparatus is as follows. The phosphoric acid analyzes approximately 30% $P_2O_5$ and contains 0.25-6% solids, typically about 2% solids, ranging from finely divided material to fairly coarse particles. The acid (already mixed with polyacrylamide flocculant in the known way), is fed into entrance chute 31 at the rate of about 100 gallons per minute. An operable rate is 0.1-1 gpm per sq. ft. of clarifier bottom surface. The electric motor drives the rake arm assembly, via the ring gear 26, at about 10 revolutions per hour. The incoming acid splashes onto deflector plate 12, and the thus received acid is caught within the confines of the stilling well 14. It then flows down the walls of the stilling well and overflows the deflector plate into the acid within the stilling well. The liquid level within the stilling well is approximately the same as the liquid level outside the stilling well. There is thus a flow of acid down the stilling well toward the bottom of the vessel and then up and around the exterior of the stilling well, moving toward the periphery of the apparatus. In the course of this flow the heavier particles tend to drop out in the steeper segment of the apparatus, indicated at 21. The finely clarified acid overflows the apparatus at overflow weir 20, and is collected for further processing at effluent conduit 38. The underflow is picked up in conduit 22 and is pumped away for disposition through slurry pump 23. The underflow is collected at the rate of about 8% of the feed rate, by volume and may contain about 20-45% solids. The over flow is the balance and may contain about 0.1-1% solids. The feed rate measured against the capacity shows a considerable improvement over similar clarification vessels of the prior art. The total square footage (plan view basis) of the instant apparatus is about 491 square feet. Using a feed of 100 gpm, the ratio of feed per square foot is thus 0.2.

One of the essential features of the invention is the use of a settling floor having two different slopes. The outer segment (identified as 35 in FIG. 1) has either zero slope or a very mild slope, i.e., not exceeding about 10° from the horizontal. The inner segment has a much steeper slope, typically about 30°. The exterior segment accounts for about 70-90%, preferably about 85%, of the total area of the floor (viewed on a plan view basis) and the inner segment accounts for the balance. The double sloping arrangement permits clarification of the solids as well as rapid settlement, thereby permitting more efficient clarification of liquids that have a broad spectrum of suspended solids, i.e., fine solids as well as larger particle-size solids. In the arrangement as shown, the heavier solids drop out first onto the steeply sloping segment, whereas the finer solids are carried up into the exterior segment, where they settle out more slowly and are raked down into the steeper segment, where they join the larger particle-size material, and the entire mix of solids is then raked down into the exit conduit 22.

Some preferred dimensions are:

Overall diameter: 25 feet

Depth: weir wall (19), 1 ft., bottom shell, from top to bottom, 4 ft. 6 in.

Radius of internal cone (21): 4 ft. 6 in., plan view basis

Width of external settling segment (35): 8 ft., plan view basis

Stilling well 14: Height, 5 ft. 9 in., Diameter, 4 ft.

The method of using of the invented apparatus is generally applicable to liquids containing both coarse and fine suspended solids. It is particularly applicable to crude wet process phosphoric acid, analyzing typically about 30% $P_2O_5$. Broadly speaking the method contemplates the following steps:

(a) the liquid to be clarified is permitted to flow into a central collection zone (e.g., the stilling well 14); (b) the liquid is caused to flow downward, then outward and upward at an angle of about 25°-35° to the horizontal, thereby causing most of the coarse solids to drop out (cf. cone 21); (c) then, causing the liquid to continue its outward flow and upward at a reduced slope of about 0°-10° to the horizontal, during which step the fine solids drop out (cf. cone 35), thereby providing a clarified liquid as the final product (e.g., at 20); (d) the solids that have fallen out are sent to the central zone for accumulation and collection as sludge (as e.g. via 22); and (e) the clarified overflow liquid product is collected, and also the underflow sludge-containing liquid is collected.

I claim:

1. In clarification apparatus comprising a vessel defined by a circular vertical wall and a circular bottom sloping toward a central underflow exit, a rake arm suspended across said vessel and rotating on a central shaft, rakes suspended on said rake arm for sweeping solids settled on said bottom toward said exit, a peripheral overflow weir at the top of said circular wall, and means for feeding liquid toward the center of said vessel; the improvement comprising a deflector plate to receive and deflect liquid feed, a stilling well to receive deflected liquid; a vertical screw at the bottom of said central shaft and over said exit for breaking up solids; the circular bottom comprising two sections, the exterior section being at an angle of less than about 10° to the horizontal and occupying an area of 70-90% of the bottom and the interior being at an angle of about 25°-30° to the horizontal and occupying an area of 10-30% of the bottom; and the rake arm being substantially above the weir.

2. Apparatus according to claim 1 in which the exterior bottom section lies at an angle of about 10° to the horizontal and the interior bottom section at an angle of about 30°.

* * * * *